Nov. 20, 1934.  E. M. COLE  1,981,223
FERTILIZER DISTRIBUTOR
Filed July 28, 1933  2 Sheets-Sheet 1
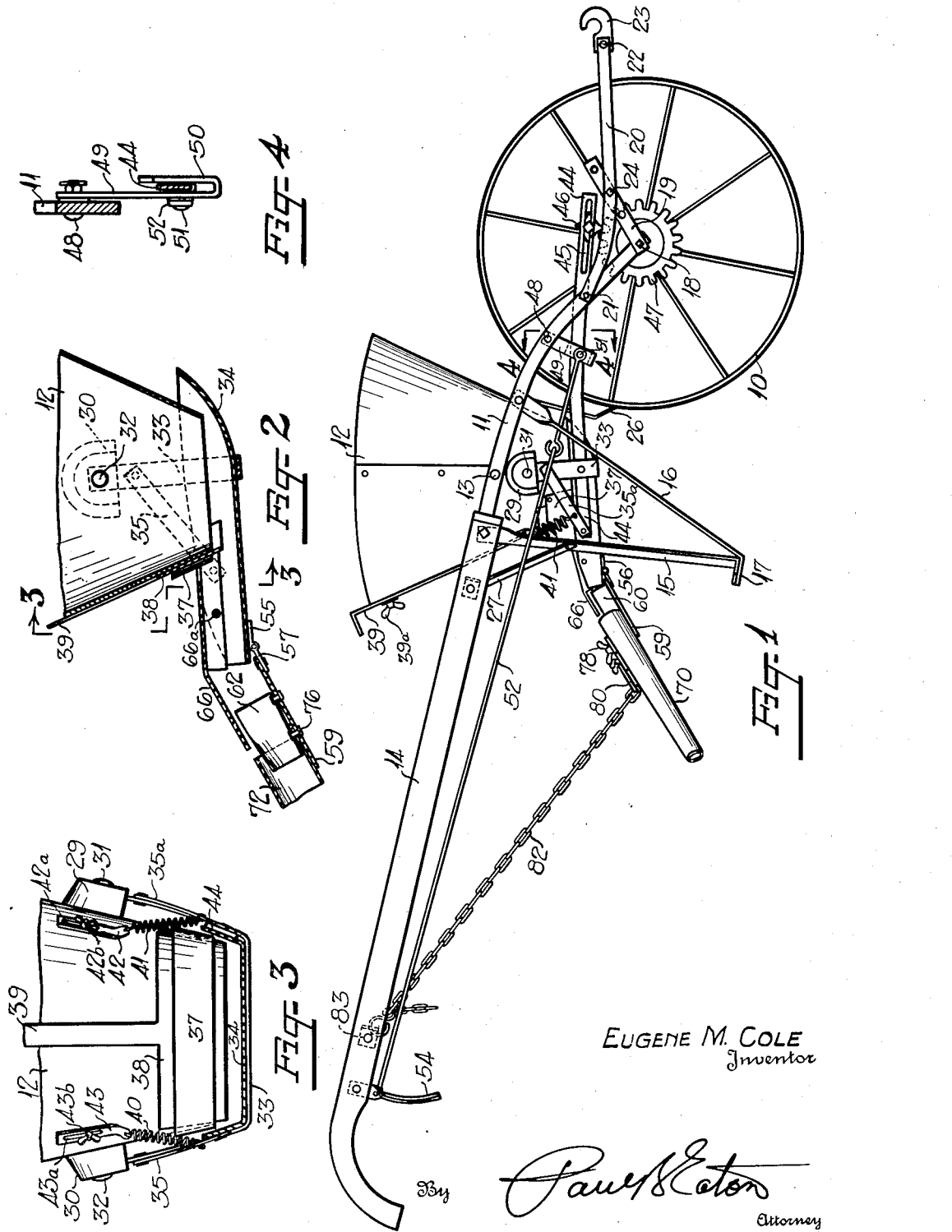
Eugene M. Cole
Inventor
By Paul S. Eaton
Attorney

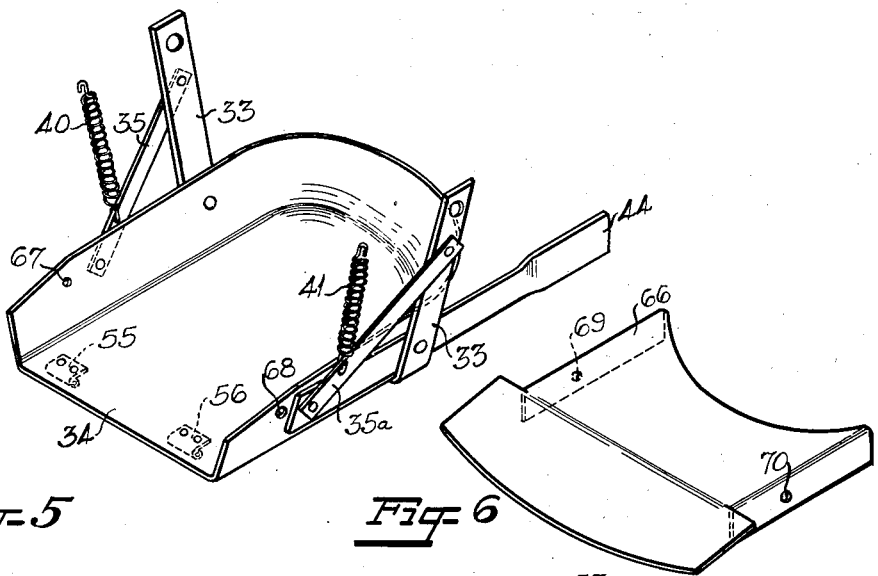
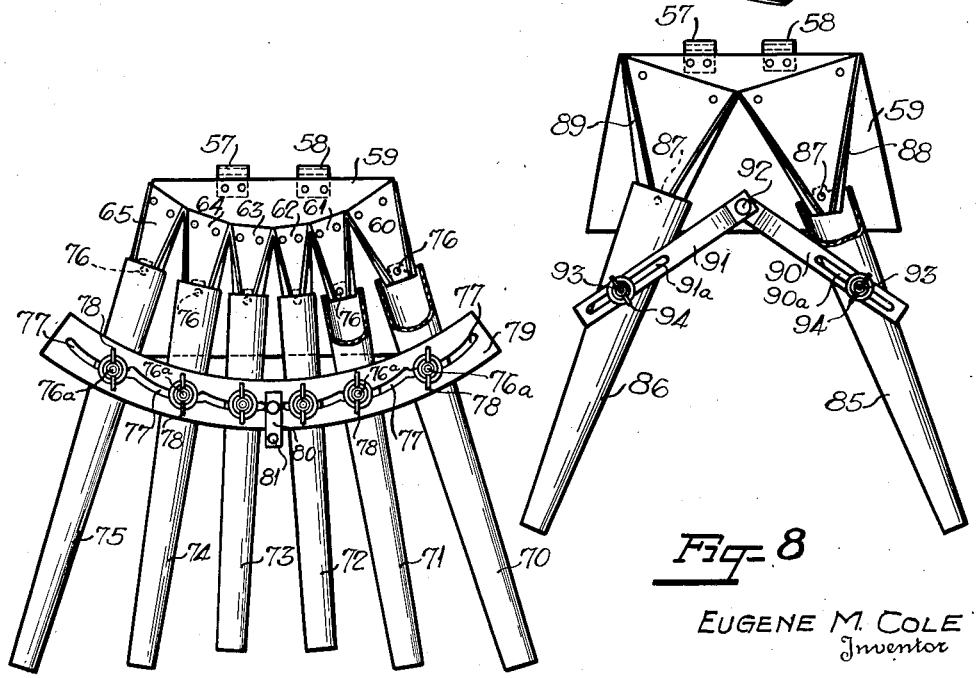

Patented Nov. 20, 1934

1,981,223

UNITED STATES PATENT OFFICE 1,981,223

FERTILIZER DISTRIBUTOR

Eugene M. Cole, Charlotte, N. C.

Application July 28, 1933, Serial No. 682,646

5 Claims. (Cl. 275—2)

This invention relates to a guano or fertilizer distributor and more especially to a machine for distributing guano, fertilizer and the like as a side dressing to growing crops, or for applying guano to the soil before the planting of the crop and other various uses which are evident from inspection of the drawings.

It is an object of this invention to provide a guano distributor having a vibrating bottom and a vibrating apron attached thereto with a plurality of spouts attached to the apron whereby it is possible to place the hopper of the distributor conveniently near the ground and still cause the fertilizer to flow positively and uniformly through the spout or spouts. Without my invention it is necessary to support the hopper in a greatly elevated position in order for the fertilizer to flow by gravity to widely separated points. This elevated position of the hopper makes the implement unwieldy, impractical and top heavy.

It is a further object of this invention to provide means for distributing guano which comprises an apron disposed in position for receiving the guano from the hopper and means for vibrating the apron, the apron having a plurality of adjustable spouts secured thereto for applying the guano to selected portions of the soil over which the distributor is travelling and means for imparting vibratory motion to the apron and spout or spouts to cause sticky or wet guano to easily flow down the spouts whereas such flow would not be possible if gravity was depended upon entirely to cause the flow.

Some of the objects of the invention having been stated other objects will appear as the description proceeds, when taken in connection with the accompanying drawings, in which—

Figure 1 is a side elevation of the guano distributor;

Figure 2 is a longitudinal sectional view showing the lower portion of the hopper and the vibrating bottom and showing a portion of the vibrating apron;

Figure 3 is a rear elevation of the lower portion of the hopper showing the vibrating bottom in cross-section and taken along line 3—3 in Figure 2 with certain portions omitted;

Figure 4 is a sectional detail view taken along line 4—4 in Figure 1;

Figure 5 is an isometric view of the vibrating bottom of the hopper;

Figure 6 is an isometric view of the cover for the rear end of the bottom and the front portion of the apron;

Figure 7 is a plan view, with portions broken away, of the apron and the spouts adjustably secured thereto;

Figure 8 is a plan view of a modified form of the apron and spouts.

Referring more specifically to the drawings the numeral 10 indicates a ground wheel rotatably mounted between two members 11, only one being shown but there is one on each side of a hopper 12, said hopper 12 being secured to members 11 by any suitable means such as bolts 13. The wheel 10 is rotatably mounted between the forward ends of members 11. To the rear ends of members 11 are secured the handle members 14, only one being shown but it being evident that there is another handle located immediately behind the one shown in Figure 1.

Secured to the handles 14 and the members 11 are downwardly projecting members 15 and 16 secured together at their bottom portions, forming a shoe 17 adapted to rest on the ground or floor to support the machine when the same is in an inoperative position. Secured on spindle 18, which is rotatably mounted in the front ends of members 11, is a pair of links 19, there being one on each side of the ground wheel 10 and hitch parts 20 are pivotally secured as at 21 in members 11, which hitch being in two parts, one on each side of the ground wheel, and joined together as at 22 to a hitch 23. The member 19 has a plurality of holes therein for adjustably supporting the hitch parts 20 by means of bolts 24 penetrating both portions of hitch parts 20 and the members 19, there being a member 19 on each side of the wheel as well as a member 20 on each side of the wheel. Secured to the hopper 12 is a scraper 26, adapted to clear the rim of the ground wheel of soil or other substances which might adhere thereto.

Each handle member 14 has secured thereto a brace 27 extending downwardly and secured to the associated vertically disposed member 15 for adding rigidity to the framework of the distributor. On each side of the hopper, cuffs 29 and 30 are secured by any suitable means such as bolts 31 and 32, and pivotally secured to these bolts is a U-shaped link 33, supporting a vibrating bottom 34 mounted in spaced relation below the open lower end of the hopper. Braces 35 and 35a are also secured on each side of the member 33 and also to the sidewalls of the vibrating bottom 34. The cuffs 29 and 30 are hollowed out as shown in Figure 2 so that the U-shaped member can have free swinging movement with relation to the hopper. The hopper has also disposed therearound a band 37 which slidably supports a member 38 having an upwardly projecting portion 39, the members 38 and 39 being held in position by band 37 and nut 39a which is mounted on a suitable bolt, said bolt penetrating a slot in member 39, so that this member 38 can be adjusted vertically to determine the amount of guano which is allowed to pass out of the hopper. A pair of tension springs 40 and 41 have their lower ends secured to the links 35 and 35a and their upper ends being secured to lugs 42 and 43 having slots 42a and 43a therein penetrated by bolts 42b and 43b whereby the lugs are adjustably secured to the walls of the hopper so that the tension of the springs can be regulated to determine the amount of vibration imparted to the hopper as this will regulate the force with which the vibrating means 46 will strike the next succeeding cog in the cog wheel presently to be described. The U-shaped member 33 also has secured thereto in a rigid manner and on one side thereof, link 44 which also is secured to one sidewall of the bottom 34 and to the lower end of link 35a. This link 44 appears only on one side of the hopper as shown in Figure 1 and projects forwardly and has a slot 45 therein, in which is adjustably mounted a block 46 which is adapted to engage the toothed wheel 47 secured to ground wheel 10. It is seen that the springs 40 and 41 will hold this block 46 in constant engagement with toothed wheel 47 so that when the block 46 falls into the depressions in the toothed wheel it will give a vibratory motion to the vibrating bottom 34. The block 46 can be adjusted longitudinally of slot 45 to determine the amount of vibration or the length of swing to be imparted to the vibrating bottom 34.

Pivotally secured to member 11 seen in Figure 1, as at 48, is a link 49 which has a hooked portion 50 on the lower end thereof adapted to partially encircle the lever 44. This member 49 has pivotally secured thereto as at 51 a link 52 which projects backwardly and is pivotally secured to lever 54 near the handle portion of the distributor handle 14 nearest the observer in Figure 1. It is seen that by moving the lever 54 clockwise in Figure 1 that the block 46 will be raised upwardly to where it will not engage the toothed wheel 47 when it is desired to transport the distributor from one place to another without operating the bottom to distribute guano.

It is seen that the front end of the vibrating bottom is curved with an arc whose center is the bolts 31 and 32, while the rear end is planular. This rear end has on the lower surface thereof hinges 55 and 56 to which are pivotally secured the hinges 57 and 58 on the front end of an apron 59. This apron has secured on the upper surface thereof the short spouts or dividers 60, 61, 62, 63, 64, and 65. It is evident that a greater or lesser number of dividers can be used, depending on the number of points of distribution desired.

To prevent wind or other disturbing factors from interfering with the guano while it is on the vibrating bottom 34 and also on the apron 59, a suitable cover 66 is provided, which is secured to the sidewalls of the vibrating bottom by any suitable means such as rod 66a penetrating holes 67 and 68 in the sidewalls of the vibrating bottom and also holes 69 and 70 in the downwardly projecting sidewalls of the cover 66. This cover 66 not only covers the rear end of the vibrating bottom but also covers the short channels or stub spouts 60 to 65 inclusive.

The stub spouts have their sidewalls at their leading edges closely fitted to each other to divide the guano and cause an equal amount of flow into each of the spouts. Pivotally secured to the rear end of each of the stub spouts 60 to 65 inclusive and telescopically encircling the rear ends thereof are spouts 70, 71, 72, 73, 74, and 75 which are pivoted by means of a rivet 76 as shown in the cut-away portion in the upper right-hand corner of Figure 7, as well as in Figure 2. These spouts can be adjusted to cover any width of row when the distributor is passed down between two rows of plants and this adjustment is effected by means of each one of the spouts 70 to 75 inclusive having integral therewith a bolt 76a on its upper side penetrating a slot 77 in arcuate member 79 and having a wing nut 78 on the upper end of the bolt. It is seen that each end of the slots 77 for each of the spouts is drawn on an arc of a circle whose center is a bolt 76 which pivotally secures the spouts 70 to 75 to the apron 59 and to the spouts 60 to 65 inclusive. The arcuate member 79 has secured thereto a lug 80 to which is secured as at 81 any suitable supporting means such as a chain 82 which is secured to cross-member 83 disposed between handles 14 and it is seen that by adjusting the length of this chain 82 that the height of the lower end of spouts 70 to 75 above the ground can be regulated.

In Figure 8 a modified form of the distributing mechanism is shown which comprises a special spout unit adapted to apply fertilizer in widely separated lines either before planting or in side-dressing growing crops. In this form spouts 85 and 86 are pivoted as at 87, between apron 59 and the lower edge of smaller spouts or dividers 88 and 89 respectively. Thus far the structure is essentially the same as shown in Figure 7 but the adjustment of the free ends of these spouts is effected by means of straps 90 and 91 which are pivoted as at 92, said straps 90 and 91 have slots 90a and 91a therein. Each of spouts 85 and 86 has a bolt 93 secured in the upper side thereof and these bolts 93 are adapted to move in slots 90a and 91a when the lower ends of the spouts are being adjusted. When the proper adjustment has been made a wing nut 94 is tightened to hold the spouts in position.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. A guano distributor having a bottom, means for imparting vibratory movement to the bottom, an apron pivotally secured to the lower end of said bottom, a plurality of spouts secured to said apron for receiving the guano from the apron and delivering it to the soil over which the distributor is being moved.

2. A guano distributor having a hopper for containing the supply of guano to be distributed, a vibratory bottom for said hopper, an apron pivotally secured to said bottom for receiving the guano from the hopper, a plurality of spouts pivotally secured to the apron, and means for separately adjusting each of the spouts on their pivots laterally with respect to the apron.

3. A guano distributor having a hopper whose lower end is open, a bottom spaced from the lower end of the hopper, said bottom having sidewalls and an arcuate front end, the rear end of the bottom being planular, means for swingably mounting the bottom for oscillation with relation to the hopper, means for imparting oscillation to the bottom, a plate pivotally secured to the rear end of the bottom, a plurality of spouts pivotally secured to the plate, and means for adjusting the spouts laterally and vertically with relation to the distributor.

4. A guano distributor having a hopper provided with an open lower end, a bottom member pivotally mounted below and spaced from the open lower end of the hopper, means for imparting vibratory movement to the bottom member, an apron having its front edge pivotally secured to the rear edge of the bottom member, a plurality of guides for the guano secured to the upper side of the apron, a plurality of spouts pivotally secured to the upper side of the apron for lateral movement, the front ends of the spouts encircling the rear ends of the guides, and means for supporting said spouts intermediate their ends whereby vibratory movement in the bottom will cause the rear ends of the spouts to have vertical reciprocatory movement.

5. A guano distributor having a hopper provided with an open lower end, a bottom member spaced from said lower end of the hopper, means for imparting vibratory movement to the bottom to move the guano from the hopper and rearwardly on the bottom member, an apron having its front edge pivotally secured to the rear edge of the bottom member, a plurality of guiding members secured to the upper side of the apron for separating the bulk of guano delivered to the apron in approximately equal amounts, a plurality of spouts pivotally secured on said apron, there being a spout for each guiding member, the front edge of each spout encircling the rear end of a guiding member to receive the guano therefrom, and individual means for each spout for adjusting the spouts laterally with relation to the direction of travel of the distributor.

EUGENE M. COLE.